Sept. 28, 1948. F. MANNING 2,450,051
BABY CARRIAGE CONSTRUCTION
Filed May 2, 1944 2 Sheets-Sheet 1
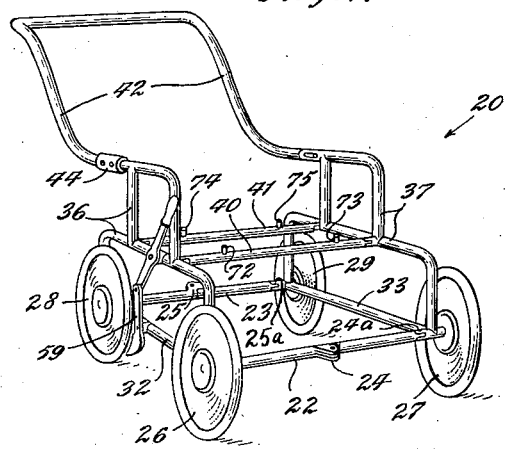
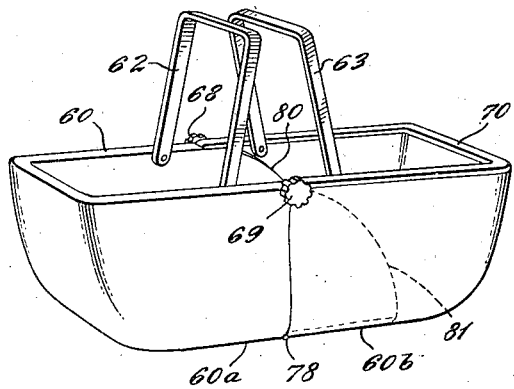
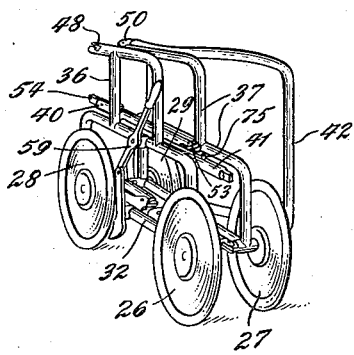
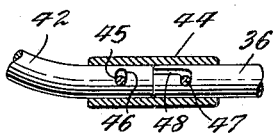
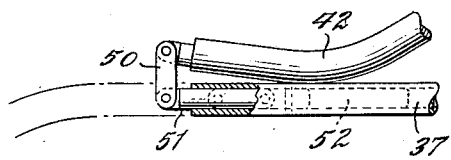
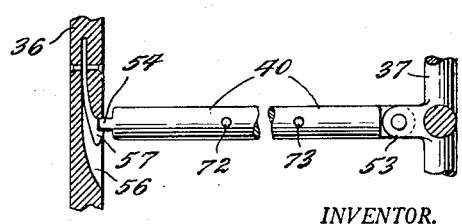
INVENTOR.
Fowler Manning
BY
ATTORNEYS Sept. 28, 1948. F. MANNING 2,450,051
BABY CARRIAGE CONSTRUCTION
Filed May 2, 1944 2 Sheets-Sheet 2
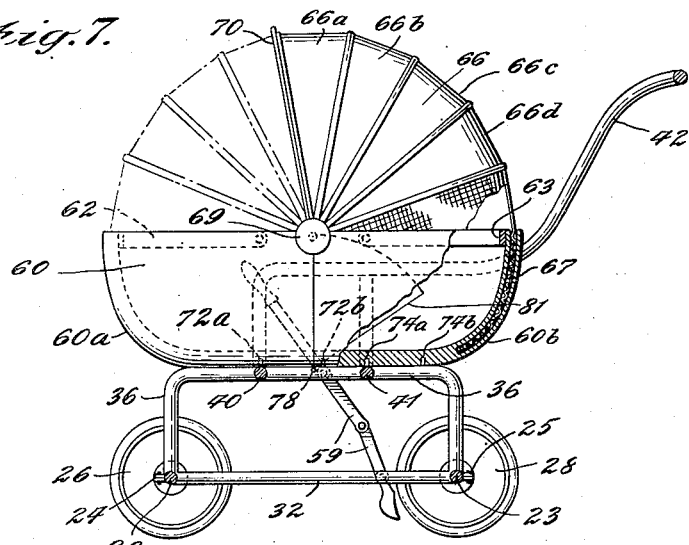
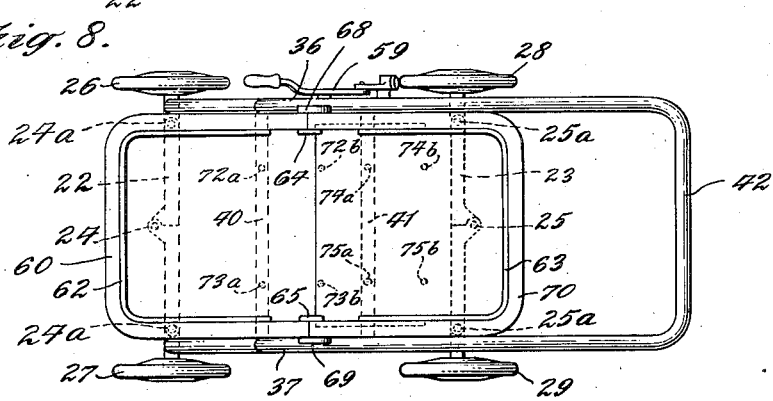
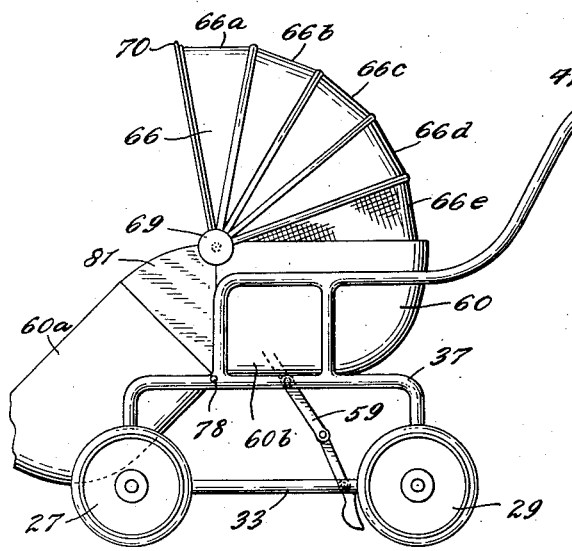
INVENTOR.
Fowler Manning
BY Blair, Curtis & Hayward
ATTORNEYS Patented Sept. 28, 1948

2,450,051

UNITED STATES PATENT OFFICE 2,450,051

BABY CARRIAGE CONSTRUCTION

Fowler Manning, Bronxville, N. Y., assignor to Carry-Cab Corporation, New York, N. Y.

Application May 2, 1944, Serial No. 533,773

2 Claims. (Cl. 280—36)

This invention relates to baby carriage constructions. More particularly it has to do with a construction combining a novel chassis, which may be foldable, with a reversible and convertible lightweight body.

For many years there has been relatively little change in conventional baby carriages. They have been functional, to a certain extent, in respect to accommodating themselves to the early needs of infants; but they have not kept pace with changes which have taken place in the ways of life of the average parent.

Thus, it is common today to see a carriage which, while being ample in size for the infant, is so heavy and unwieldy that it is impractical for use except on level sidewalks and paths. Such carriages can be moved in and out of houses only with difficulty, and although attempts have been made at rendering some of them light in weight, or foldable, the great majority of them, even including the so-called foldable ones, are too bulky to be moved readily into an automobile. To move them by means of a public conveyance, such as a street car or bus, has been out of the question. It is an object of the present invention to provide baby carriage constructions whereby both infant and carriage may be moved from house to sidewalk with ease, or may even be taken into an automobile or aboard a public conveyance by an average adult woman, and all without disturbing the infant.

Likewise, in constructions of the more conventional types, there was a definite head and foot to the carriage such that the child either had to ride headfirst or feetfirst, depending upon the particular construction. As is well known, however, there are advantages which result from being able to locate the head of the child at one end or the other of the carriage, depending upon the position of the sun, the direction and velocity of the wind, the passing fancy of the child, and other circumstances. It is true enough that in most carriages the infant, literally, might be placed either way in the carriage. Limitations in the constructions, however, have usually made this undesirable. It is an additional object of the present invention to provide a new combination whereby the body portion of the carriage may, at the will of the user, be located upon the chassis of the carriage with either of its ends facing the person pushing the carriage.

Heretofore, various attempts have been made at increasing the usefulness of carriages by making them convertible, so that when the infant has reached the age of a year, more or less, the carriage may be made into a stroller wherein the child assumes a sitting position. It is an additional object of the present invention to provide a novel combination whereby the body of the carriage may be converted in a thoroughly practicable manner into a body of the stroller type, and wherein the combination is such that the child may ride either forward or backward in a sitting position.

Other objects will be in part pointed out as the description proceeds and will in part be apparent.

The invention accordingly consists in the features of construction, combinations of elements and arrangements of parts as will be exemplified in the structure to be hereinafter described and the scope of the application of which will be indicated in the accompanying claims.

In the accompanying drawings:

Figure 1 is a perspective view of a carriage chassis embodying the present invention;

Figure 2 is a perspective view of the chassis of Figure 1 showing the manner in which it may be folded;

Figure 3 is a perspective view of a body adapted to be used singly, or in combination, with the chassis illustrated in Figure 1;

Figures 4, 5 and 6 are fragmentary views on an enlarged scale, with parts removed, of details of the chassis illustrated in Figure 1;

Figure 7 is a side elevation, with parts removed and in section, showing the chassis and body in combination;

Figure 8 is a plan view of the chassis and body; and,

Figure 9 is a side elevation showing the body converted to form a carriage of the stroller type.

In Figure 1, a chassis generally indicated by the numeral 20 is illustrated consisting of a front axle 22 and a rear axle 23 in association with various supports and framework, to be described hereinafter. Axle 22 is particularly characterized by the fact that it includes at its central portion a hinge 24 and at each side a pivot 24a. Correspondingly, axle 23 is provided at its midpoint with a hinge 25 and at each side with a pivot 25a. Axle 22 is located between wheels 26 and 27, and axle 23 is located between wheels 28 and 29. A pair of longitudinally extending rods 32 and 33 are provided between the two axles. Rod 32 is associated with a frame piece 36, and rod 33 is associated with a frame piece 37. These frame pieces are laterally braced by a pair of cross bars 40 and 41, and each frame piece at its upper portion provides a support for a handle piece 42.

Handle piece 42 is removable from frame piece 36 and is pivotally connected to frame piece 37 so that it may be folded to assume the position illustrated in Figure 2. Figure 4 shows a detail of the manner in which handle piece 42 is connectable to frame piece 36. A sleeve 44 is held to the end of handle piece 42 by means of a pin 45. This pin is integral with sleeve 44 and is movable within a lost motion slot 46 in the handle piece. The lost motion slot allows sleeve 44 to be rotated with respect to handle piece 42. Sleeve 44 also includes a bayonet pin 47, while the end of frame piece 36 is provided with a bayonet slot 48 adapted to receive bayonet pin 47. Lost motion slot 46 allows sleeve 44 to be telescoped over the end of frame piece 36 with bayonet pin 47 sliding into bayonet slot 48 to the locked position illustrated in Figure 4. In this position a strong and rigid connection is formed between the handle and frame pieces.

Figure 5 illustrates how the pivoted end of handle piece 42 is permanently connected to frame piece 37. Handle piece 42 is pivoted upon one end of a link 50, which link in turn is pivotally connected at its other end to a slide piece 51 telescopically movable within a bore 52 in the end of frame piece 37. Slide piece 51 is rotatable within bore 52 through ninety degrees and is prevented from being removed entirely from bore 52. When handle piece 42 is folded to the position illustrated in Figure 2, slide piece 51 is moved to the left, as viewed in Figure 5, with respect to frame piece 37 so as to expose link 50 and allow the double pivotal movement to take place.

Figure 1 illustrates the manner in which link 50 may be telescoped completely within bore 52 of frame piece 37 so as to provide a strong joint such that the chassis may be pushed and maneuvered in a normal manner.

Figure 6 shows the arrangement whereby bar 40 is connected between frame pieces 36 and 37. A hinge 53 is provided at the right-hand side of cross bar 40, as viewed in Figure 6, connecting the bar to frame piece 37. The left-hand end of bar 40 is provided with a projection 54 which cooperates with a latch portion 56 in frame piece 36. A detent 57 serves to hold projection 54 within the latch so that the cross bar cannot be disengaged from frame piece 36 unless it is intentionally unlatched. Figure 2 shows how cross bar 40 folds against frame piece 37. Cross bar 41 (see Figure 1) is provided with a hinge at its left-hand end, as viewed in Figure 1, similar to hinge 53, so that it may be folded to the collapsed position illustrated in Figure 2.

Thus, by unlatching the two free ends of cross bars 40 and 41, each bar may be folded so as to assume a position beside its associated frame piece. And handle piece 42 may be unlocked from frame piece 36 by means of sleeve 44, and folded to the position illustrated generally in Figure 2. The chassis is then collapsed the rest of the way by moving hinges 24 and 25 toward one another so as to bring rods 32 and 33 adjacent one another as illustrated.

In the embodiment illustrated, a brake 59 is shown associated with wheel 28.

Figure 3 shows a body 60 suitable for use upon chassis 20 and provided with a pair of bails 62 and 63. These may be folded out of sight below the edge of the body, or, as illustrated in Figure 3, may form a pair of handles for carrying the body about as a separate baby carrying unit. A top 66 (see Figure 7) is fitted into a top recess 67 in one end of body 60. The top is formed of a series of top sections 66a, 66b, etc., to be described more fully hereinafter, and the top may be locked in any position desired by means of a pair of adjustment knobs 68 and 69. A cover strip 70 forms the leading edge of the top and serves to seal recess 67 when the top is fully collapsed therewithin. Sections 66a, 66b, etc., preferably are made of some material such as waterproof silk, except for the last section, which may advantageously be made of some material such as netting, so that when the top is positioned to cover the entire body, this last section provides for ventilation to the interior thereof.

In Figure 1 it will be observed that cross bar 40 is provided with a pair of pins 72 and 73, and that cross bar 41 is provided with a pair of pins 74 and 75. The bottom of body 60 is provided with four corresponding pin seats 72a, 73a, 74a, and 75a (see Figures 7 and 8) so that the body may be positioned upon chassis 20 and maintained with the desired configuration thereupon by means of the cooperating pins and pin seats. A second set of pin seats 72b, 73b, 74b, and 75b (see Figures 7 and 8) are provided for a purpose to be described hereinafter. If desired, provision may be made for positively retaining the pins and pin seats in engagement except when it is desired to remove the body from the chassis.

Running across the bottom of body 60 is a piano hinge 78 (see Figures 3 and 7). Body 60 is formed from two parts, a front part 60a and a rear part 60b. These parts are connected to one another by this piano hinge. A pair of cathodes 64 and 65 (see Figure 8) are provided so that the front part may be lowered, as shown in Figure 9, with respect to the rear part 60b. As shown in Figure 1, however, body 60 rests squarely upon cross bars 40 and 41, and in order to lower part 60a with respect to part 60b it is necessary to move body 60 with respect to chassis 20, thus bringing pin seats 72b, 73b, 74b and 75b in to mating relationship with pins 72, 73, 74 and 75. By so moving body 60 with respect to chassis 20, piano hinge 78 comes into juxtaposition with cross bar 40 and part 60a overhangs the front end of the chassis and may be lowered until it rests upon axle 22. A pair of gussets 80 and 81 are provided on front body part 60a so as to bridge the space which otherwise would occur between the body parts when front part 60a is lowered.

Thus, it is seen that the combination of body 60 with chassis 20 provides a construction which may be used as illustrated in Figure 7 to accommodate a recumbent infant. Likewise, because of the symmetrical arrangement of pins and pin seats, the body may be positioned upon the chassis so that the head of the infant is toward either end of the chassis, as desired. The combination may be brought into the relationship illustrated in Figure 9, where the carriage becomes one of the stroller type. And the reversibility of body with respect to chassis applies to the stroller as well as to the infant's model. The construction, therefore, is such that the carriage may be used with facility during the first few years of a child's life, instead of for only a relatively short period. And it provides a greater flexibility of functions while in use.

The chassis stands alone on its four wheels when folded and it may be rolled about on its wheels almost as easily when folded as when unfolded. Hence, it need not be continuously carried when collapsed and in fact may serve as a support whether folded or unfolded. A further advantage resides in the fact that the body may be carried into the home and used as a crib, so that if the child goes to sleep while having an airing it need not be awakened when returned to the house. This is an accomplishment made practical only by a construction such as described.

From a purely artistic standpoint the invention lends itself admirably to full use of lightweight plastic materials, light metals, and novel color combinations. In one form the body is made from a pressed, thermoplastic-impregnated, fabric lined with foam rubber, while the chassis consists largely of Duralumin tubing. Various contrasting color schemes are contemplated, including the use of luminous paints such as will render the carriage visible in the dark.

As many possible embodiments may be made of the above invention without departing from the scope thereof, and as changes will be necessitated in adapting the various embodiments to specific applications, it is to be understood that all matter herein set forth or shown in the accompanying drawings is to be interpreted as illustrative and not in a limiting sense.

I claim:

1. In baby carrying apparatus of the type described, the combination including a collapsible, wheeled chassis and an individually removable and easily portable crib-like basket; said apparatus being characterized by the fact that said basket is convertible into a chair-like structure, whereby it may be used either for a recumbent infant or for an erectly-sitting child; and said apparatus being further characterized by the fact that said chassis and basket are provided with a plurality of cooperating pin and pin seat arrangements whereby the chassis and basket may be secured together in combination, one pin and pin seat arrangement serving to hold the basket in its original infant-carrying position upon the chassis and another pin and pin seat arrangement serving to hold the basket upon the chassis when the basket is converted into a chair-like structure.

2. In apparatus of the character described, a collapsible wheeled chassis including a pair of axles running transversely of said chassis, a pair of frame pieces running longitudinally of said chassis, one along each side thereof, and a pair of cross bars extending transversely between the upper portions of said frame pieces; said axles and cross bars including hinge means, whereby the chassis may be collapsed, and said cross bars comprising pin-like means adapted to cooperate with and support either a crib-like body for carrying a recumbent infant or a stroller-type body for carrying an erectly sitting child.

FOWLER MANNING.

REFERENCES CITED

The following references are of record in the file of this patent:

UNITED STATES PATENTS

| Number | Name | Date |
|---|---|---|
| 98,742 | Chevallier et al. | Jan. 11, 1870 |
| 234,547 | Doyle | Nov. 16, 1880 |
| 325,685 | Matthews | Sept. 8, 1885 |
| 396,496 | Kempster | Jan. 22, 1889 |
| 530,449 | Orr | Dec. 4, 1894 |
| 957,874 | Ford | May 17, 1910 |
| 1,006,493 | McGill | Oct. 24, 1911 |
| 1,437,052 | Garrett et al. | Nov. 28, 1922 |
| 1,461,458 | Robinson | July 10, 1923 |
| 1,550,415 | Anderson | Aug. 18, 1925 |
| 1,594,256 | Greene | July 27, 1926 |
| 1,741,014 | Debelack | Dec. 24, 1929 |
| 1,762,680 | Debelack | June 10, 1930 |
| 1,869,205 | Mahr | July 26, 1932 |
| 1,880,167 | Baerulfsen | Sept. 27, 1932 |
| 1,881,579 | Hoch et al. | Oct. 11, 1932 |
| 2,197,333 | Bianchi | Apr. 16, 1940 |

FOREIGN PATENTS

| Number | Country | Date |
|---|---|---|
| 325,944 | Great Britain | Mar. 6, 1930 |
| 472,841 | Great Britain | Mar. 31, 1937 |